United States Patent
Klamt et al.

(10) Patent No.: US 9,331,538 B2
(45) Date of Patent: May 3, 2016

(54) WINDING FOR A ROTATING ELECTRIC MACHINE AND METHOD FOR MANUFACTURING SAME

(71) Applicant: ALSTOM RENEWABLE TECHNOLOGIES, Grenoble (FR)

(72) Inventors: Thomas Klamt, Schinznach-Dorf (CH); Esther Haenni-Bechir, Muelligen (CH)

(73) Assignee: ALSTOM RENEWABLE TECHNOLOGIES, Grenoble (FR)

( * ) Notice: Subject to any disclaimer, the term of this patent is extended or adjusted under 35 U.S.C. 154(b) by 444 days.

(21) Appl. No.: 13/622,502

(22) Filed: Sep. 19, 2012

(65) Prior Publication Data

US 2013/0069459 A1    Mar. 21, 2013

(30) Foreign Application Priority Data

Sep. 19, 2011    (EP) ..................... 11181775

(51) Int. Cl.
*H02K 11/00* (2006.01)
*H02K 3/38* (2006.01)

(52) U.S. Cl.
CPC ............. *H02K 3/38* (2013.01); *Y10T 29/49009* (2015.01)

(58) Field of Classification Search
CPC ................................. H02K 5/22; H02K 5/225
USPC ............................. 310/71, 214, 215
See application file for complete search history.

(56) References Cited

U.S. PATENT DOCUMENTS

| | | | | |
|---|---|---|---|---|
| 4,112,183 A | * | 9/1978 | Smith | 428/363 |
| 4,328,437 A | * | 5/1982 | Inticbar et al. | 310/52 |
| 4,626,721 A | * | 12/1986 | Ouchi | 310/71 |
| 5,729,068 A | * | 3/1998 | Gasparini et al. | 310/179 |
| 7,119,644 B2 | * | 10/2006 | Snitchler et al. | 335/216 |
| 2009/0189473 A1 | * | 7/2009 | Castle | H02K 1/04 310/186 |
| 2013/0049519 A1 | * | 2/2013 | Lang | H02K 3/30 310/215 |

FOREIGN PATENT DOCUMENTS

| | | |
|---|---|---|
| CL | 1682-2002 | 8/2003 |
| CL | 1621-2006 | 2/2007 |
| CL | 3575-2007 | 5/2008 |
| JP | 55094552 A | 7/1980 |
| JP | 58003552 A | 1/1983 |
| JP | 60028733 A | 2/1985 |
| JP | H0652349 U | 7/1994 |

OTHER PUBLICATIONS

Office Action issued Sep. 12, 2014, by the Chilean Patent Office in corresponding Chilean Patent Application No. 2561-12. (6 pages).
Office Action (Patent Examination Report No. 1) issued on Aug. 4, 2014, by the Australian Patent Office in corresponding Australian Patent Application No. 2012216833. (3 pages).
Extended European Search Report issued on May 3, 2012, by the European Patent Office in corresponding European Patent Application No. 11181775.5-2207. (6 pages).

* cited by examiner

*Primary Examiner* — Naishadh Desai
(74) *Attorney, Agent, or Firm* — Buchanan Ingersoll & Rooney PC

(57) ABSTRACT

A winding for a rotating electric machine includes conductive bars having straight parts and end windings and terminal portions of the end windings that are connected together. A protective cap is disposed on at least a portion of each respective connected end winding terminal portion. An electrical insulating material is disposed between each end winding terminal portion and respective protective cap and a seal is inside each protective cap.

14 Claims, 3 Drawing Sheets

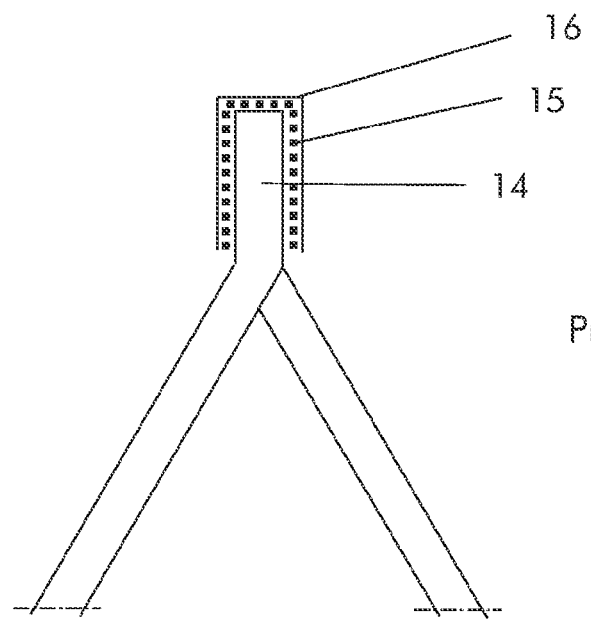
Fig. 1
Prior art
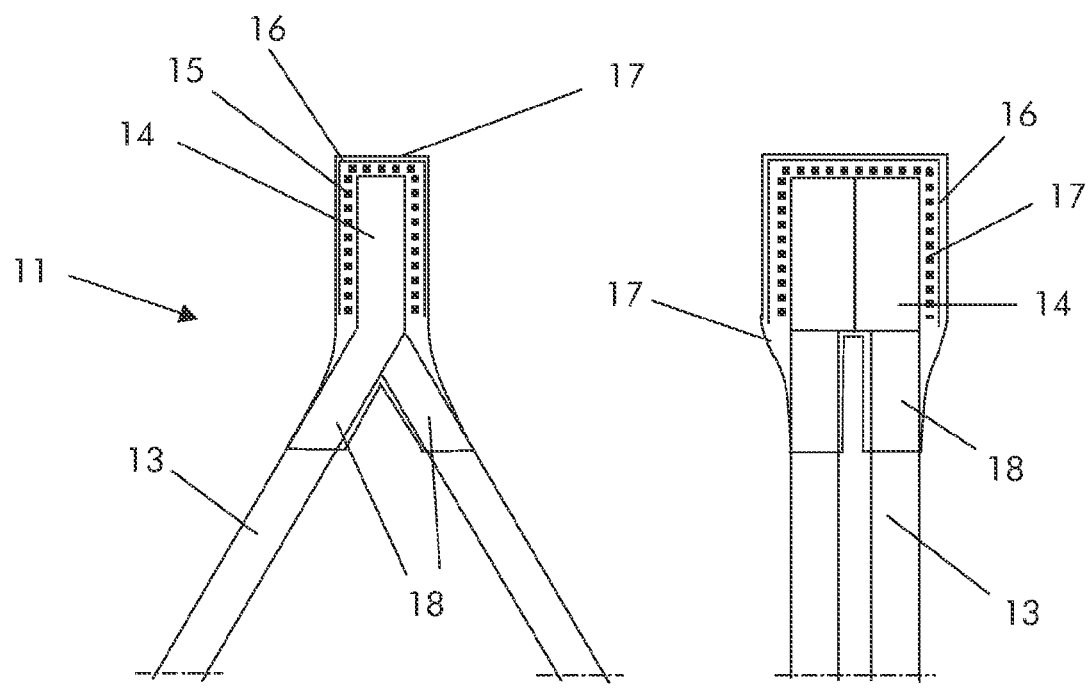
Fig. 2
Fig. 3

WINDING FOR A ROTATING ELECTRIC MACHINE AND METHOD FOR MANUFACTURING SAME

CROSS REFERENCE TO RELATED APPLICATIONS

This application claims priority to European Patent Application No. EP 11 18 1775.5, filed Sep. 19, 2011, which is hereby incorporated by reference herein in its entirety

FIELD

The present invention relates to winding for a rotating electric machine and a method for manufacturing same.

In particular the rotating electric machine can be a ring motor or a pump for a storage plant with variable speed; naturally in different examples the rotating electric machine can also be a different electric motor (i.e. different from a ring motor). Additionally, the electric machine can also be an electric generator.

In the following particular reference to a ring motor is made.

BACKGROUND

FIG. 4 schematically shows an example of a rotating electric machine such as a ring motor 1.

Ring motors 1 have a stator 2 and a rotor 3 rotating within it; the stator 2 and rotor 3 have large dimensions such that a tool to be activated by the motor 1 is at least partly within the rotor 3.

In this respect FIG. 5 shows a typical example of application of a ring motor to a mill (gearless mill).

The ring motor 1 is connected to and drives the mill 5 that is provided with a mouth 6 for introducing the material to be treated into it.

The stator 2 and the rotor 3 are well known to include windings 10 made of conductive bars 11 housed in slots of the stator 2 or rotor 3.

The conductive bars have straight parts 12 that are housed in the slots, and end windings 13 that are outside of the slots and are bent with respect to the straight parts 12; these end windings 13 have terminal portions 14 that are connected together to define the windings 10.

In addition, to electrically and mechanically protect the terminal portions 14, above the electrically connected terminal portions 14 an electric insulating material 15 and protective caps 16 are provided.

The motor 1 is housed within an airtight casing; this casing prevents the motor from being influenced and possibly damaged by external, environmental factors.

Nevertheless, in some cases, the airtight properties of the casing get lost; when this occurs environmental factors such as humidity, water, mud, dust can enter the casing, causing risks of damages to the electric machine.

In particular applications such as ring motors for mills, because of the environment where the ring motors have to operate, these risks can be particularly high.

SUMMARY

In an embodiment, the present invention provides a winding for a rotating electric machine includes conductive bars having straight parts and end windings and terminal portions of the end windings that are connected together. A protective cap is disposed on at least a portion of each respective connected end winding terminal portion. An electrical insulating material is disposed between each end winding terminal portion and respective protective cap and a seal is inside each protective cap.

BRIEF DESCRIPTION OF THE DRAWINGS

Further characteristics and advantages of the invention will be more apparent from the description of a preferred but non-exclusive embodiment of the winding and method illustrated by way of non-limiting example in the accompanying drawings, in which:

FIG. 1 is a schematic view of end windings connected according to the prior art;

FIGS. 2 and 3 respectively show a front view and a side view of reciprocally connected end windings in an embodiment of the invention;

DETAILED DESCRIPTION OF EMBODIMENTS OF THE INVENTION

Figure 4:
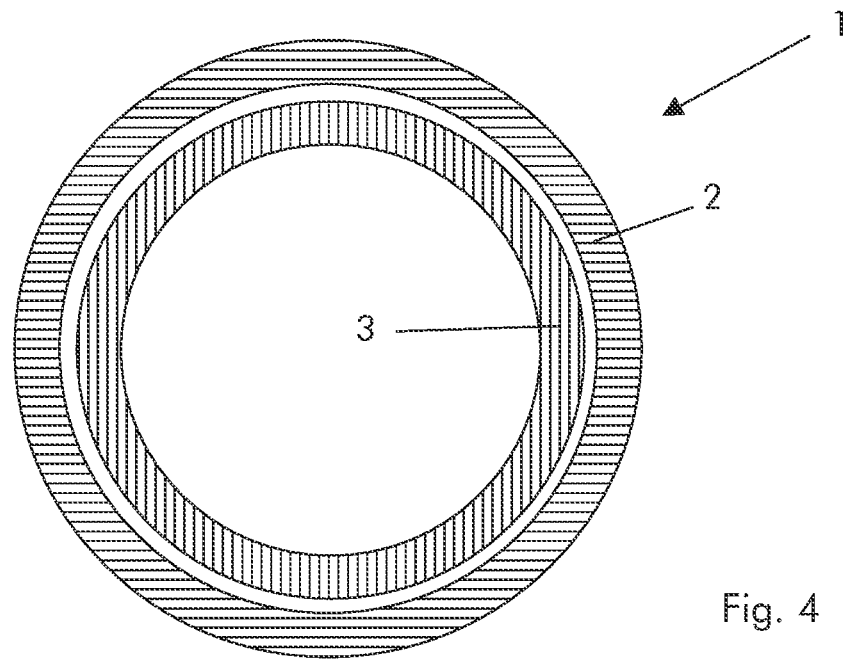
FIG. 4 schematically shows a front view of a ring motor.
Figure 5:
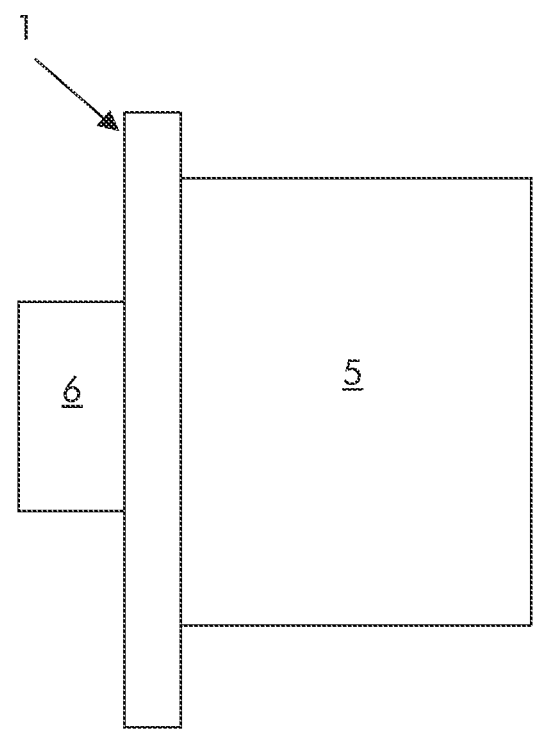
FIG. 5 schematically shows a side view of a mill.

Embodiments of the invention provide a winding and a method by which the risks of damages to the electric machine caused by environmental factors are reduced.

In the following like reference numerals designate identical or corresponding parts throughout the several views.

The winding 10 for a rotating electric machine has conductive bars 11 including straight parts 12 and end windings 13.

Figure 6:
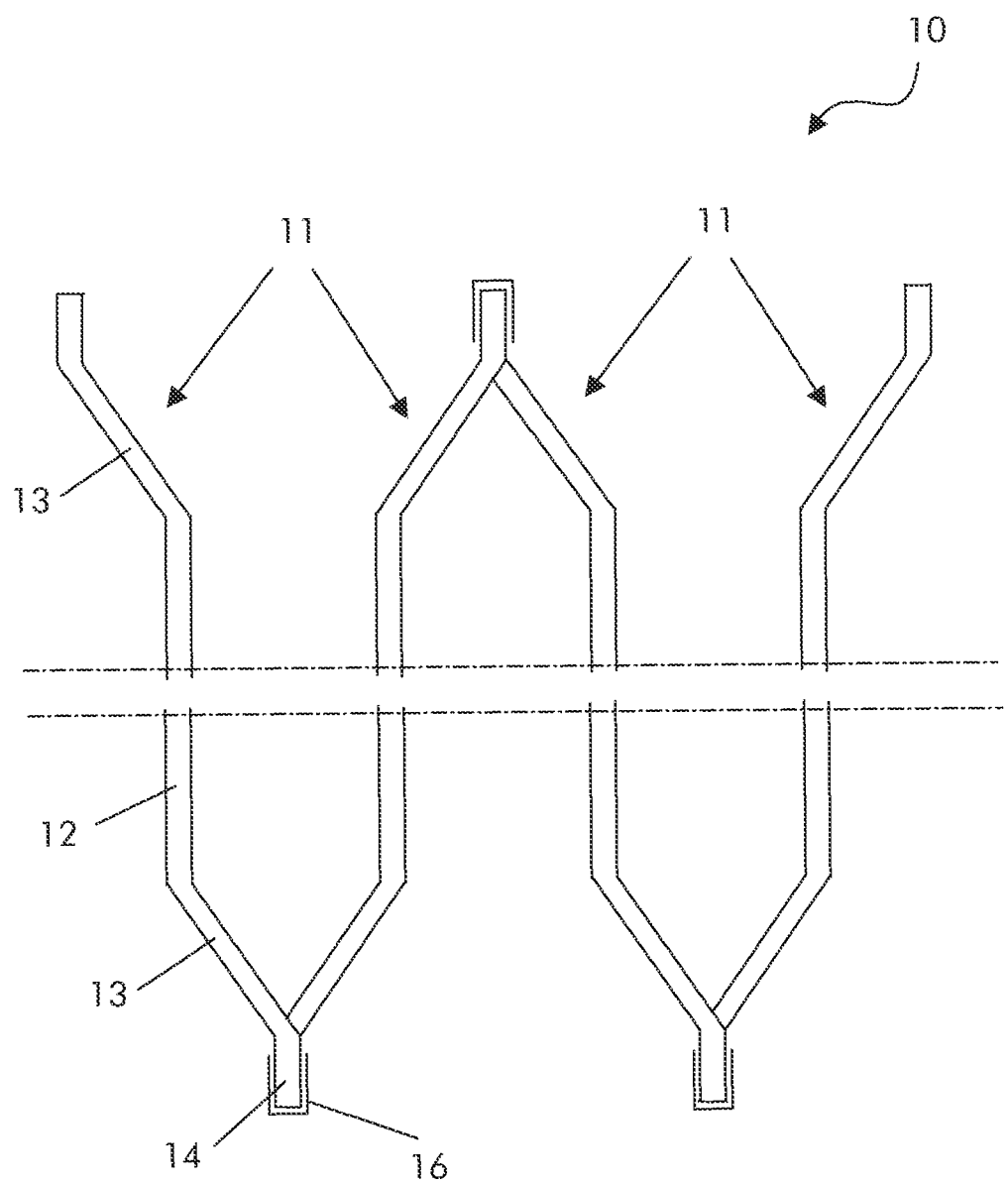
FIG. 6 schematically shows a portion of a winding of a ring motor.

In the attached FIG. 6 the end windings 13 of each conductive bars 11 are shown projecting from opposite sides of the straight parts 12 (this scheme is typical for hydro generators and ring motors); it is clear that in different examples the end windings 13 of each conductive bar 11 can also extend from the same side of each straight part 12 (this scheme is typical for turbogenerators).

The end windings 13 have terminal portions 14 that are connected together.

In addition, protective caps 16 are provided above at least a portion of the reciprocally connected end winding terminal portions 14 and an electric insulating material 15 (such as a putty for electrical applications) is provided between the end winding terminal portions 14 and the caps 16.

Advantageously, seals 17 are provided for the inside of the caps 16.

These seals 17 close and protect the inside of the caps 16 that contains the insulating material 15 and the electrically connected terminal portions 14 in case water, dust, mud or any other environmental factors enter the casing.

The material of the seals 17 is different from the electrical insulating material 15.

The material of the seal 17 can be an electrically conductive material; this solution is preferably used when the insulating cap 16 is grounded. Alternatively the material of the seal 17 can be an electrically insulating material; this solution is preferably used when the insulating cap 16 is not grounded.

The seals 17 cover at least a portion of the external surface of the caps 16 and preferably they completely cover the external surface of the caps 16.

In addition, the seals 17 cover at least a portion 18 of the end windings 13; these portions 18 are at least partly outside of the caps 16.

The seals 17 are preferably flexible (to cope with the deformations of the end windings during operation) and are defined by a resin layer.

In different embodiments the winding described can be a stator winding and/or a rotor winding.

The operation of the winding is apparent from that described and illustrated and is substantially the following.

In case during operation water, mud, dust, humidity or other environmental factors enter the casing, they wet the end windings 13 but, thanks to the seals 17, they cannot enter the inside of the caps 16 prejudicing the insulating material properties and causing electrical troubling.

In addition, when the caps 16 are completely covered by the seals 17, the seals 17 can constitute an additional electric insulating layer improving electrical insulation.

The present invention also refers to a method for manufacturing a winding for a rotating electric machine.

The method comprises the steps of:

providing conductive bars 11 including straight parts 12 and end windings 13, connecting together terminal portions 14 of the end windings 13, providing protective caps 16 above at least a portion of the connected end winding terminal portions 14, providing an electrical insulating material 15 between the end winding terminal portions 14 and the caps 16, providing seals 17 for the inside of the caps 16.

Providing the seal 17 preferably includes spreading a liquid resin and then polymerising it.

The liquid resin can be any resin having the required properties, for example it can be silicon or an epoxy resin.

Advantageously the resin is a room temperature polymerisation resin.

In a particular example the following silicone can be used:

Elastolid M-4643 A (resin),

Elastolid M-4643 B (hardener).

Spreading includes spreading the liquid resin on at least a portion of the external surface of the caps 16; anyhow the liquid resin can also be spread on the whole external surface of the caps 16.

In addition, spreading includes spreading the liquid resin on at least a portion 18 of the end windings 13, this portion 18 being outside of the caps 16.

For example, the liquid resin can be spread by a roller or a brush or spry gun or can be applied by dipping.

Naturally the features described may be independently provided from one another.

In practice the materials used and the dimensions can be chosen at will according to requirements and to the state of the art.

While the invention has been particularly shown and described with reference to preferred embodiments thereof, it will be understood by those skilled in the art that various changes in form and details may be made therein without departing from the spirit and scope of the invention.

REFERENCE NUMBERS 1 ring motor
2 stator
3 rotor
5 mill
6 mouth
10 winding
11 conductive bars
12 straight parts of 11
13 end windings of 11
14 terminal portions of 13
15 electric insulating material
16 caps
17 seals
18 portions of 13

What is claimed is:

1. A winding for a rotating electric machine comprising:
conductive bars including straight parts and end windings;
terminal portions of the end windings that are connected together;
a protective cap disposed on each respective whole connected end winding terminal portion;
an electrical insulating material disposed between each end winding terminal portion and respective protective cap; and
a polymerized liquid resin seal inside of each of the protective caps.

2. The winding recited in claim 1, wherein a material of the seals is different from the electrical insulating material.

3. The winding recited in claim 1, wherein a material of the seals is an electrically insulating material.

4. The windings recited in claim 1, wherein a material of the seals is an electrically conductive material.

5. The winding recited in claim 1, wherein the seals cover at least a portion of an external surface of the caps.

6. The winding recited in claim 5, wherein the seals completely cover the external surface of the caps.

7. The winding recited in claim 1, wherein the seals cover at least a portion of the end windings that is outside of the caps.

8. The winding recited in claim 1, wherein the seals are flexible.

9. The winding recited in claim 1, wherein the winding is a stator winding.

10. The winding recited in claim 1, wherein the winding is a rotor winding.

11. A method for manufacturing a winding for a rotating electric machine, the method comprising:
providing conductive bars including straight parts and end windings;
connecting terminal portions of the end windings;
providing a protective cap above each whole connected end winding terminal portion;
providing an electrical insulating material between each end winding terminal portion and respective cap; and
providing a seal for the inside of each of the caps by spreading a liquid resin and then polymerizing the liquid resin.

12. The method recited in claim 11, wherein the seals include a material that is different from the electrical insulating material.

13. The method recited in claim 11, wherein the spreading includes spreading the liquid resin on at least a portion of an external surface of the caps.

14. The method recited in claim 11, wherein the spreading includes spreading the liquid resin on at least a portion of the end windings that is outside of the caps.

* * * * *